Patented Aug. 30, 1949

2,480,341

UNITED STATES PATENT OFFICE 2,480,341

CATALYST FOR CARBON MONOXIDE-HYDROGEN SYNTHESIS

Herman S. Seelig, Chicago, Ill., and James Zisson, Whiting, Ind., assignors to Standard Oil Company, Chicago, Ill., a corporation of Indiana No Drawing. Application December 26, 1947, Serial No. 794,120

4 Claims. (Cl. 260—449.6)

1

This invention relates to a new and improved catalyst for effecting carbon monoxide-hydrogen synthesis and it pertains more particularly to the use of an improved promoter for catalysts of the iron type.

Carbon monoxide-hydrogen synthesis has been effected with various types of catalysts in synthesis processes which have been commonly referred to as Fischer-Tropsch, synthol, synthine, hydrocol, etc. Many of such processes employ promoted iron-type catalysts as exemplified by those described in U. S. Patent 2,254,806. An outstanding catalyst for such operations is the type of catalyst employed in ammonia synthesis, the production of such catalyst being fully described in Chemical Engineering Progress, volume 43, pages 291–302 (June, 1947). Heretofore it has been considered that a small amount of an alkali metal was the best promoter and that such promoter might be incorporated into the catalyst in the form of sodium carbonate, potassium carbonate, potassium fluoride, etc. although certain anions such as chloride have been reported to be deleterious. An object of our invention is to provide a catalyst which will effect greater conversion and give a more desirable product distribution than catalyst heretofore known to the art. A further object is to provide a catalyst which will effect almost quantitative conversion at lower temperatures than temperatures required by other known catalysts. A further object is to provide a catalyst which will produce maximum yields of normally liquid hydrocarbons and normally gaseous hydrocarbons other than methane.

A further object of the invention is to provide an improved method for making the synthesis catalyst. A further object is to provide a promoter for iron-type catalysts which radically differs in its promoting effect from any promoters heretofore employed. An additional object of the invention is to reduce the hazard of carbon formation in a direct synthesis from CO by operating at lower than conventional temperatures. Other objects will be apparent as the detailed description of the invention proceeds.

We have found that when an iron oxide such as $Fe_3O_4$ is fused with a small amount of iron fluoride and the fused mass is subsequently cooled, broken up into small particles and reduced by extended treatment with hydrogen at

2 high temperature the resulting catalyst is of remarkable effectiveness in effecting carbon monoxide-hydrogen synthesis at temperatures in the vicinity of about 500 to 550° F. Preferably ferric fluoride is intimately mixed with finely divided $Fe_3O_4$ and subsequently fused, broken into smaller particles and reduced. The synthesis step per se may be effected in the same way that it is effected with other catalysts except that excellent conversion and product distribution is obtainable at lower temperatures.

The catalyst may be prepared by intimately mixing about 1 mol of $FeF_3$ with about 33 mols of finely divided $Fe_3O_4$ and heating the mixture to a temperature sufficient to effect fusion. The fused mass is then cooled and broken up into pieces of small particle size which in fluid type operation may be of the order of 1 to 200 microns and for fixed bed operations may be of the order of about 6 to 14 mesh. The particles may then be placed in a synthesis reactor and reduced with hydrogen at a temperature of about 600 to 1000° F., e. g. about 800° F. under a pressure of atmospheric to several hundred pounds per square inch, e. g. about 50 pounds per square inch and at a space velocity which may be of the order of several hundred or a thousand or more volumes of gas per hour per volume of catalyst particles. For finely divided catalyst particles the reduction may be effected in a few hours but for coarser particles, e. g. 6 to 14 mesh in particle size, it is desirable to employ a prolonged reduction step which may be of the order of about 200 hours. After the reduction step the catalyst is ready for use and the system may simply be cooled to a temperature of 500° F. or less preparatory to introducing charging stock.

The carbon monoxide-hydrogen charge may be prepared in any known manner and the ratio of hydrogen to carbon monoxide is preferably about 2:1 although it may be anywhere in the range of 1:1 to 4:1. The charge may contain diluent gases such as carbon dioxide but it is preferably substantially free from water or steam. Conversion may be effected at a temperature of about 500° F. under a pressure of 300 p. s. i. (gage) and at a space velocity of about 100 volumes per hour of charging stock per volume of catalyst. Syntheses made under the above conditions on an unpromoted iron catalyst, our improved catalyst and a conventional catalyst (type employed for ammonia synthesis) gave the following results

|  | Unpromoted Iron | Iron-Iron Fluoride | | Alkali promoted Iron (ammonia synthesis) | |
|---|---|---|---|---|---|
| Catalyst Age, days on stream | 5.7 | 5.0 | 10 | 5.0 | 10 |
| CO Conversion (Wt. per cent) | 71.5 | 96.0 | 91.9 | 77.1 | 48.3 |
| *Product (grams/100 grams CO converted)* | | | | | |
| $C_{3+}$ (in gas) | 3.8 | 8.6 | 6.5 | 7.5 | 6.5 |
| Observed Oil | 9.8 | 11.2 | 11.0 | 8.6 | 20.1 |
| Total Oil | 13.6 | 19.8 | 17.5 | 16.1 | 26.6 |
| $H_2O$ | 24.6 | 33.0 | 18.9 | 11.7 | 10.3 |
| $CO_2$ | 52.1 | 46.1 | 50.9 | 37.4 | 36.0 |
| $CH_4$ | 9.8 | 5.2 | 4.2 | 4.0 | 8.2 |
| $C_2$ | 2.5 | 5.9 | 4.5 | 4.0 | 3.5 |

From the above data it will be observed that at the 500° F. synthesis temperature the iron-iron fluoride catalyst gave a remarkably higher conversion than either unpromoted iron or the iron-type catalyst containing an alkali metal promoter. It will also be observed that the decrease in conversion with continued on-stream use was enormously less in the case of the iron-iron fluoride catalyst than in the case of the ammonia synthesis type catalyst.

In the test runs the products from the synthesis reactor were passed through a so-called wax trap at about 300° F., then through a water-cooled condenser and finally through a propane-cooled condenser which operated at about −35° F. The "observed" oil is the sum of products condensed in these three recovery stages. The "$C_{3+}$" is the amount of propane, propylene and higher boiling (chiefly $C_4$) hydrocarbons which escaped condensation in the previously named condensing steps. It will be observed that our iron-iron fluoride catalyst produced more low boiling hydrocarbons ($C_{3+}$), more observed oil and more total oil than unpromoted catalyst. When the weight percent conversion is considered the superiority of our catalyst over the ammonia synthesis type catalyst is likewise clearly evident; after ten days on stream the total oil based on carbon monoxide charged is 91.9 times 17.5 or about 16% in the case of our iron-iron fluoride catalyst while in the case of the alkali promoted iron catalyst it is only 48.3 times 26.6 or less than 13%. It will also be observed that after the longer period of use the ammonia synthesis type catalyst produced almost twice as much methane as our iron-iron fluoride catalyst.

At synthesis temperatures below 500° F. the weight percent CO conversion effected with our iron-iron fluoride catalyst falls off quite rapidly and we therefore prefer to operate at a synthesis temperature higher than 450° F. and preferably higher than 475° F. with this particular catalyst. Our catalyst operates effectively at temperatures up to about 600° F. Thus at 550° F. we obtained a weight percent CO conversion of about 95%, a $C_{3+}$ of 7.0 and observed oil yield of 5.2 giving a total oil of 12.2 grams per 100 grams of CO converted. At 575° F. we obtained a weight percent CO conversion of about 96% with a $C_{3+}$ of 8.1 and an observed oil of 3.0 giving a total oil of 11.1 grams of total oil per 100 grams of CO converted. At temperatures materially higher than 650° F. at this particular p. s. i. pressure there is a considerable decrease in $C_{3+}$ and a marked decrease in observed oil with excessively large production of methane.

While we have described a catalyst employing 1 mol of $FeF_3$ per 33 mols of $Fe_3O_4$, it should be understood that the amount of $FeF_3$ may be somewhat greater or less than about 3 mol percent, the amount being usually in the range of 0.3 to 15 mol percent and preferably in the range of 0.9 to 9 mol percent based on the total mols of $FeF_3$ and $Fe_3O_4$. The $Fe_3O_4$ is merely given as an example of an iron oxide from which the catalyst may be prepared. An equivalent number of mols of iron from any source such as from other oxides of iron or metallic iron may be used. The 0.3 to 15 mol percent of $FeF_3$ applies when the major component of the catalyst consists of $Fe_3O_4$. If catalytic metallic iron or FeO is used as the major component of the catalyst, the mol percent range of $FeF_3$ is about 0.1 to 5 mol percent. On the other hand, if $Fe_2O_3$ is used as the major component, the range of mol percent of $FeF_3$ will be from 0.2 to 10 mol percent. In other words, our invention contemplates the promoting of conventional iron catalyst with the defined amounts of iron fluoride. Ferrous instead of ferric fluoride may be used. Beneficial effects may even be obtainable by treating iron catalyst with elemental fluorine or hydrofluoric acid although such procedure cannot be said to be equivalent to the fusion of iron fluoride with iron oxide followed by the reduction step hereinabove described.

It should be understood that the synthesis operation itself may be carried out in any known manner in fixed bed, fluidized solids or slurry-type operations. The pressure should usually be in the range of 150 to 500 p. s. i., preferably about 250 to 400 or about 300 p. s. i. The temperature should usually be in the range of about 500 to 600° F. for a maximum conversion and oil production although in certain cases beneficial results may be obtained at somewhat higher or lower temperatures. The space velocity will be dependent upon the nature of the charging stock and to some extent upon catalyst particle size in fluidized catalyst operation. The space velocity may vary within a relatively wide range, e. g. from about 50 to 12,000 or more volumes per hour per volume of catalyst depending somewhat upon the hydrogen to carbon monoxide ratio and upon the amount of diluent present.

We claim:

1. The method of effecting carbon monoxide-hydrogen synthesis which comprises contacting a carbon monoxide-hydrogen mixture under synthesis conditions with an iron type catalyst promoted by iron fluoride and effecting said contacting at a temperature in the range of about 500 to 600° F.

2. The method of effecting carbon monoxide-hydrogen synthesis which comprises contacting a carbon monoxide-hydrogen mixture at a pressure in the range of 150 to 550 pounds per square inch and at a temperature in the range of about 500 to 600° F. with a catalyst prepared by fusing an iron oxide with a small amount of $FeF_3$, cooling the fused mass and breaking it up into small particles and reducing said small particles by treatment with hydrogen at a temperature in the range of about 600 to 1000° F.

3. The method of effecting synthesis which comprises contacting a carbon monoxide-hydrogen mixture at a pressure in the range of 150 to 550 pounds per square inch and at a temperature in the range of about 500 to 600° F. with an iron catalyst promoted by iron fluoride.

4. The method of effecting synthesis which comprises contacting a carbon monoxide-hydrogen mixture at a pressure in the range of 150 to 550 pounds per square inch and at a temperature in the range of about 500 to 600° F. with a catalyst prepared by fusing iron oxide with an amount of iron fluoride in the range of .1 to 5 mol precent iron fluoride based on atoms of iron in the iron oxide and subsequently reducing the resulting composition with hydrogen.

HERMAN S. SEELIG.
JAMES ZISSON.

REFERENCES CITED

The following references are of record in the file of this patent:

UNITED STATES PATENTS

| Number | Name | Date |
| --- | --- | --- |
| 1,306.862 | Starke | June 17, 1919 |
| 1,681,751 | Storch | Aug. 21, 1928 |
| 1,771,130 | Larson | July 22, 1930 |
| 2,194,186 | Pier et al. | Mar. 19, 1940 |
| 2,245,157 | Pier et al. | June 10, 1941 |
| 2,254,806 | Michael | Sept. 2, 1941 |
| 2,287,891 | Linckh | June 30, 1942 |